United States Patent
De Man et al.

(10) Patent No.: US 10,628,973 B2
(45) Date of Patent: Apr. 21, 2020

(54) HIERARCHICAL TOMOGRAPHIC RECONSTRUCTION

(71) Applicant: General Electric Company, Schenectady, NY (US)

(72) Inventors: Bruno Kristiaan Bernard De Man, Clifton Park, NY (US); Lin Fu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 15/400,782

(22) Filed: Jan. 6, 2017

(65) Prior Publication Data

US 2018/0197314 A1    Jul. 12, 2018

(51) Int. Cl.
*G06T 11/00* (2006.01)

(52) U.S. Cl.
CPC ............... *G06T 11/006* (2013.01)

(58) Field of Classification Search
CPC ............... G06T 11/006; G06T 11/003
See application file for complete search history.

(56) References Cited

U.S. PATENT DOCUMENTS

| | | | |
|---|---|---|---|
| 6,151,377 A * | 11/2000 | Nilsson | G06T 11/006 378/4 |
| 6,282,257 B1 | 8/2001 | Basu et al. | |
| 6,771,732 B2 | 8/2004 | Xiao et al. | |
| 7,227,982 B2 | 6/2007 | De Man et al. | |
| 7,924,972 B2 | 4/2011 | Koehler et al. | |
| 8,121,378 B2 | 2/2012 | George et al. | |
| 2006/0109949 A1 * | 5/2006 | Tkaczyk | A61B 6/032 378/4 |
| 2007/0052700 A1 | 3/2007 | Wheeler et al. | |
| 2015/0238148 A1 | 8/2015 | Georgescu et al. | |

OTHER PUBLICATIONS

Xiao Feng Ma, Makoto Fukuhara, and Tatsuoki Takeda "Neural Network CT Image Reconstruction Method for Small Amount of Projection Data", Dec. 1999; Nuclear Instruments and Methods in Physics Research A 449 (2000); pp. 366-377. (Year: 1999).*

Prince, Jerry L., et al.; "Hierarchical reconstruction using geometry and sinogram restoration",IEEE Transactions on Image Processing, vol. 2, Issue: 3, pp. 1103-1117, Jul. 1993.

Basu, Samit, et al.; "Filtered backprojection reconstruction algorithm for tomography", IEEE Transactions on Image Processing, 9(10), 1760-1773,2000.

Basu, Samit, et al.; "Error analysis and performance optimization of fast hierarchical backprojection algorithms", IEEE Transactions on Image Processing, vol. 10, Issue: 7, pp. 1103-1117, Jul. 2001.

(Continued)

*Primary Examiner* — Siamak Harandi

(57) ABSTRACT

The present disclosure relates to the use of a hierarchical tomographic reconstruction approach that employs data representations in intermediate steps are between a full line integral and a voxel (e.g., an intermediate line integral). Each of the steps is progressively more local in nature and therefore has computational advantages and is also amenable to a deep learning solution using trained neural networks. The proposed hierarchical structure provides a mechanism to divide a large-scale inverse problem into a series of smaller-scale problems.

12 Claims, 14 Drawing Sheets

(56) References Cited

OTHER PUBLICATIONS

Hornung, Alexander, et al.; "Hierarchical Volumetric Multi-view Stereo Reconstruction of Manifold Surfaces based on Dual Graph Embedding", CVPR '06 Proceedings of the 2006 IEEE Computer Society Conference on Computer Vision and Pattern Recognition, vol. 1, pp. 503-510, 2006.
Liu, Yingjie, et al.; "Non-Oscillatory Hierarchical Reconstruction for Central and Finite Volume Schemes", Communications in Computational Physics, vol. 2, Issue: 5, pp. 933-963, Oct. 2007.
George, Ashvin, et al.; "Fast Tomographic Reconstruction via Rotation-Based Hierarchical Backprojection", Society for Industrial and Applied Mathematics, vol. 68, Issue: 2, pp. 574-597, 2007.
Stampanoni, M., et al.; "Hierarchical multimodal tomographic x-ray imaging at a superbend", Proc. SPIE 7078, Developments in X-Ray Tomography VI, pp. 11, Sep. 17, 2008.
Xu, Zhiliang, et al.; "Point-wise Hierarchical Reconstruction for Discontinuous Galerkin and Finite Volume Methods for Solving Conservation Laws", Sep. 6, 2010.
Langet, Helene, et al.; "Compressed-sensing-based content-driven hierarchical reconstruction: theory and application to c-arm cone-beam tomography", Medical Physics, vol. 42, Issue: 9, pp. 5222-5237, Sep. 2015.

\* cited by examiner

HIERARCHICAL TOMOGRAPHIC RECONSTRUCTION

BACKGROUND

The subject matter disclosed herein relates to tomographic reconstruction, and in particular to the use of deep learning techniques to reconstruct data, such as projection or other scan-type data, into diagnostically or clinically useful images, including cross-sectional images and/or volumetric representations.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through the target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

All reconstruction algorithms are subject to various trade-offs, such as between computational efficiency, patient dose, scanning speed, image quality, and artifacts. Therefore, there is a need for reconstruction techniques that may provide improved benefits, such as increased reconstruction efficiency or speed, while still achieving good image quality or allowing a low patient dose.

BRIEF DESCRIPTION

In one embodiment, a hierarchical tomographic reconstruction method is provided. In accordance with this method, a set of scan data is acquired or accessed. The set of scan data is initially represented by a set of original measurements. The set of scan data is processed using a hierarchy of reconstruction steps. At least a portion of the reconstruction steps process the set of original measurements through a progression of one or more intermediate line integral representations. The intermediate line integral representations are processed to generate voxel values of a reconstructed image.

In a further embodiment, an image processing system is provided. In accordance with this embodiment, the image processing system includes: a processing component configured to execute one or more stored processor-executable routines; and a memory storing the one or more executable-routines. The one or more executable routines, when executed by the processing component, cause acts to be performed comprising: acquiring or accessing a set of scan data, wherein the set of scan data is initially represented by a set of original measurements; processing the set of scan data using a hierarchy of reconstruction steps, wherein at least a portion of the reconstruction steps process the set of original measurements through a progression of one or more intermediate line integral representations; and processing the intermediate line integral representations to generate voxel values of a reconstructed image.

In another embodiment, a neural network training method is provided. In accordance with this method, pairs of corresponding target images and measurements are acquired or accessed. At least a portion of layers of a neural network are trained to generate intermediate representations between corresponding target images and measurements. At least an output layer of the neural network is trained to generate a reconstructed image from intermediate representations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
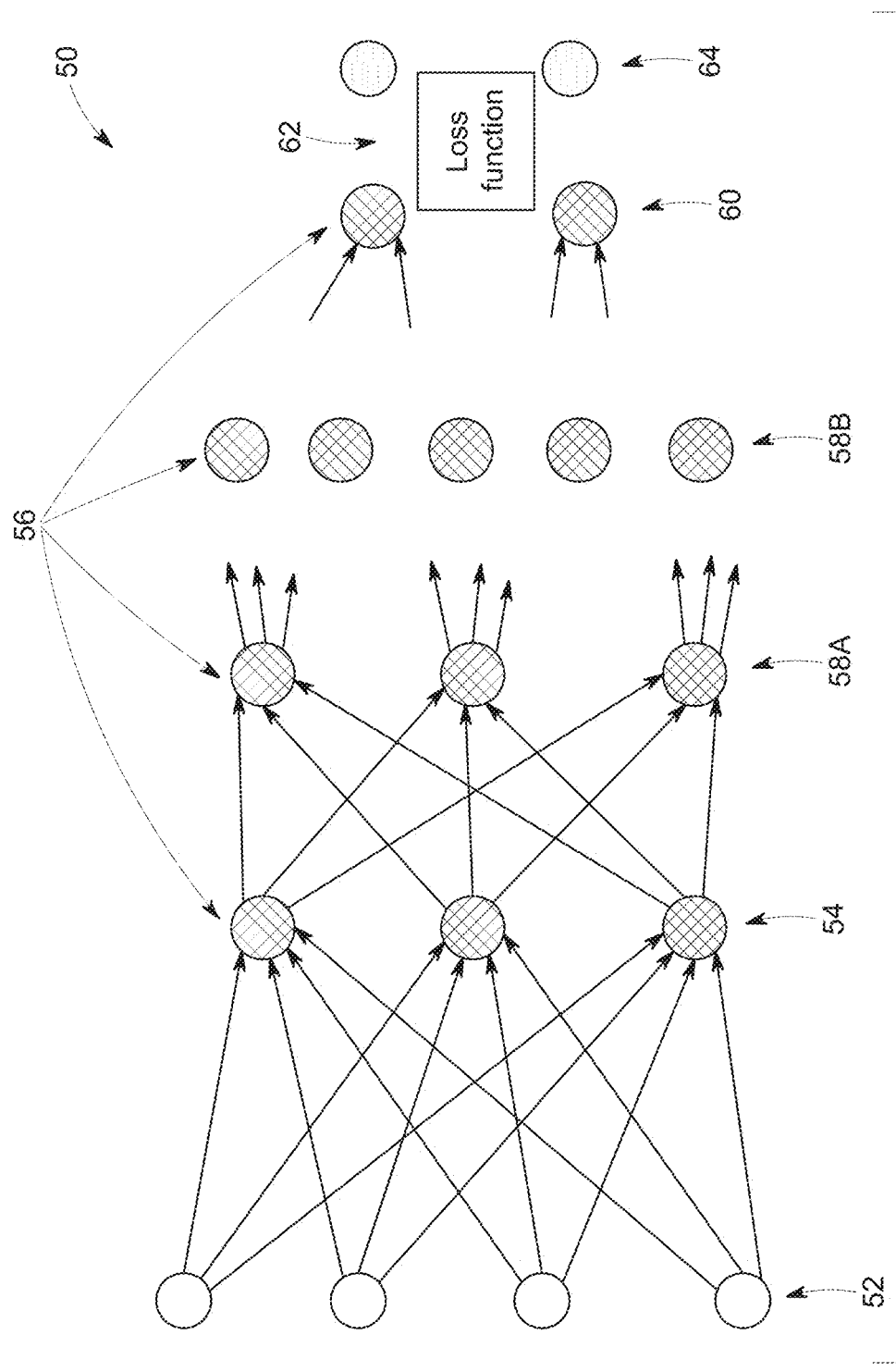
FIG. 1 depicts an example of an artificial neural network for training a deep learning model, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure While aspects of the following discussion are provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context or image processing field where a set or type of acquired data undergoes a reconstruction process to generate an image or volume.

Furthermore, while the following discussion focuses on standard images or image volumes, it should be understood that the same approach can also be applied to sets of images or image volumes corresponding to different aspects of the scan. For example, spectral CT produces a set of images, including monochromatic images at different energies as well as basis material decomposition images. Or as another example, dynamic CT or PET produces a set of images at different time points. The current invention may be applied to these sets or types of images, where the input to the hierarchy of reconstruction steps or neural networks are multiple sets of images or scan data sets and the prediction is also a set of images.

Further, though CT and C-arm examples are primarily provided herein, it should be understood that the present approach may be used in other imaging modality contexts where tomographic reconstruction processes are employed. For instance, the presently described approach may also be employed on data acquired by other types of tomographic scanners including, but not limited to, positron emission tomography (PET) scanners, single photon emission computed tomography (SPECT) scanners, and/or magnetic resonance imaging (MRI) scanners.

By way of introduction, several imaging modalities, such as X-ray CT (e.g., multi-slice CT) and X-ray C-arm systems (e.g., cone-beam CT), measure projections of the object or patient being scanned where the projections, depending on the technique, correspond to Radon transform data, fan-beam transform data, or cone-beam transform data. In other contexts the scan data may be emission type data (e.g., PET or SPECT data) or magnetic resonance data (e.g., MRI data). Using tomographic reconstruction techniques, cross-sectional images or volumetric images can be estimated or "reconstructed" from such scan data.

Conventional reconstruction techniques typically use reconstruction algorithms that can either be characterized as direct reconstruction (which execute an explicit inversion step) or as optimization-based reconstruction (which iteratively optimize a cost function). Direct reconstruction approaches are relatively fast but lack an efficient way to suppress noise and certain artifacts. Optimization-based reconstruction approaches offer improved noise reduction and can incorporate physics effects in the forward model that are not easily inverted analytically, but such approaches are relatively computationally expensive. In both cases, a single voxel is typically computed based on all the projection data that went through that single voxel. Conversely, each projection data point is used for all voxels that were penetrated by the respective projection line. Hence, the reconstruction process is not local, and neither the system matrix nor its inverse is highly sparse.

In other approaches, which may be generally characterized as hierarchical in nature, an image may be reconstructed by progressively dividing the image into smaller and smaller sub-regions for reconstruction. Such approaches may be characterized as hierarchical projection and backprojection approaches, and differ from the approaches discussed herein, which instead employ progressively intermediate line integrals in the reconstruction process, which are not employed in the hierarchical projection and backprojection approaches. Moreover, these hierarchical projection and backprojection approaches do not fundamentally change the reconstruction process itself, but instead provide a fast implementation of the projection operation or backprojection operation as part of an existing reconstruction formulation.

With this in mind, the present approach involves a different type of reconstruction paradigm that is hierarchical in that it goes from line integrals to image voxels in two or more steps, i.e., intermediate steps, where the data representations in the intermediate steps are between a full line integral and a voxel (e.g., an intermediate line integral or a weighted line integral). Each of the steps is progressively more local in nature (e.g., shorter line integrals) and therefore has computational advantages and is amenable to a deep learning solution, as described herein. In this manner, the proposed hierarchical structure provides a mechanism to divide a large-scale inverse problem into a series of smaller-scale problems. Though many of the following explanations and figures presented or described are in a two-dimensional context so as to simplify explanation and facilitate understanding, it should be appreciated that extension to three-dimensions (i.e., spatial volumes in three-dimensions) and four-dimensions (spatial volumes in three-dimensions over time) is envisioned and extension to multiple dimensions is straightforward based on the principles discussed herein.

With the preceding introductory comments in mind, some embodiments of the approaches described herein utilize deep learning techniques as part of the reconstruction process used to generate tomographic images, such as CT, PET, SPECT, C-arm, phase-contrast, and MR images. As discussed herein, deep learning techniques (which may also be known as deep machine learning, hierarchical learning, or deep structured learning) are a branch of machine learning techniques that employ mathematical representations of data and artificial neural network for learning. By way of example, deep learning approaches may be characterized by their use of one or more algorithms to extract or model high level abstractions of a type of data of interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In particular, as discussed herein, different layers may correspond to a progression of intermediate line integrals having different length and angle characteristics in a progression from full line integrals to voxel data. Processing may therefore proceed hierarchically, i.e., from full line integrals to voxel data. In practice, each layer may employ one or more linear and/or non-linear transforms to process the input data (typically the output of the preceding layer) to an output data representation for the respective layer.

In general, the processing from one representation space to the next-level representation space can be considered as one 'stage' of the reconstruction process. Each stage of the reconstruction can be performed by separate neural networks or by different parts of one larger neural network. For example, as discussed herein, a single deep learning network may cover all stages in a reconstruction process (e.g., from an initial input (such as a sinogram) to an output image (such as a reconstructed image). Alternatively, separate distinct deep learning network(s) may each cover only one stage (or a subset of stages) of the overall reconstruction process. For example, in the present context, such a single stage may be from an initial input (e.g., sinogram) to a partial line integral, from one partial line integral to another (e.g., from a longer partial line integral to a shorter), or from a partial line integral to the output image.

As discussed herein, as part of the initial training of deep learning processes to solve a particular problem, training data sets may be employed that have known initial values (e.g., input images, projection data, emission data, magnetic resonance data, and so forth) and known or desired values for a final output (e.g., reconstructed tomographic reconstructions, such as cross-sectional images or volumetric representations) of the deep learning process. The training of a single stage may have known input values corresponding to one representation space (e.g., partial line integrals over a certain length) and known output values corresponding to a next-level representation space (e.g., partial line integrals over a shorter length). In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

By way of visualization, FIG. 1 schematically depicts an example of an artificial neural network 50 that may be trained as a deep learning model as discussed herein. In this example, the network 50 is multi-layered, with a training input 52 and multiple layers including an input layer 54, hidden layers 58A, 58B, and so forth, and an output layer 60 and the training target 64 present in the network 50. Each layer, in this example, is composed of a plurality of "neurons" or nodes 56. The number of neurons 56 may be constant between layers or, as depicted, may vary from layer to layer. Neurons 56 at each layer generate respective outputs that serve as inputs to the neurons 56 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 60 (e.g., predicted image) which, in conjunction with a target image 64, are used to compute some loss or error function 62, which will be backpropagated to guide the network training.

The loss or error function 62 measures the difference between the network output (i.e., the predicted image) and the training target (i.e., the target image). In certain implementations, the loss function may be the mean squared error (MSE) of the voxel-level values or partial-line-integral values and/or may account for differences involving other image features, such as image gradients or other image statistics. Alternatively, the loss function 62 could be defined by other metrics associated with the particular task in question, such as a softmax function.

With the preceding in mind, the neural network 50 may be trained for use in hierarchical reconstruction as discussed herein. For example, the supervised training of the convolution kernels of the neural network 50 may be accomplished using training pairs of ground truth images (i.e., target data) and the corresponding sinograms (i.e., input data). Similarly, the target data and the input data can be a dataset of partial line integrals of a certain length and type. To supplement (or replace) the available high dose clinical datasets for training, computer simulations of sinogram data (i.e., projection or scan acquisition data) and partial line integral data from clinical images with translation, rotation, scaling, and mirroring can be used. It is also possible to use computer generated random patterns (e.g., Gaussian blobs, random noise patterns, random shapes, and so forth) to generate the training pairs.

In a training example, the neural network 50 may first be constrained to be linear (i.e., by removing all non-linear units) to ensure a good initialization of the network parameters. The neural network 50 may also be pre-trained stage-by-stage using computer simulated pairs of sinogram data and the corresponding intermediate representations (e.g., partial limited-angle reconstructions or intermediate line integral representations) or output images, as discussed in greater detail below. After pre-training, the neural network 50 may be trained as a whole and further incorporate non-linear units.

To facilitate explanation of the present hierarchical reconstruction using deep learning techniques, the present disclosure primarily discusses these approaches in the context of a CT or C-arm system. However, it should be understood that the following discussion may also be applicable to other image modalities and systems including, but not limited to, PET, SPECT, multi-spectral CT, phase-contrast imaging, and MRI, as well as to non-medical contexts or any context where tomographic reconstruction is employed to reconstruct an image.

Figure 2:
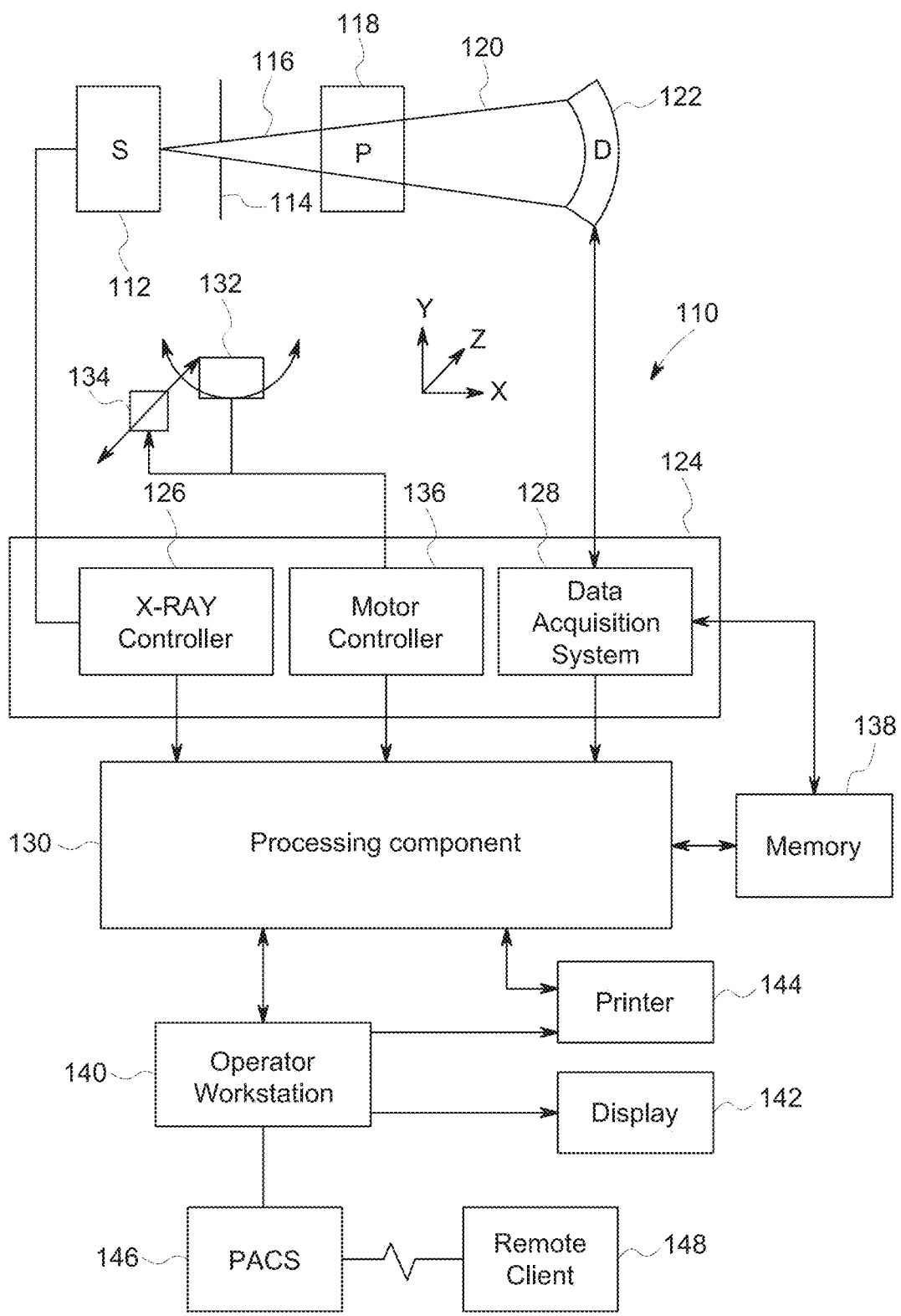
FIG. 2 is a block diagram depicting components of a computed tomography (CT) imaging system, in accordance with aspects of the present disclosure.

With this in mind, an example of an imaging system 110 (i.e., a scanner) is depicted in FIG. 2. In the depicted example, the imaging system 110 is a CT imaging system designed to acquire scan data (e.g., X-ray attenuation data) at a variety of views around a patient (or other subject or object of interest) and suitable for performing image reconstruction using tomographic reconstruction techniques. In the embodiment illustrated in FIG. 2, imaging system 110 includes a source of X-ray radiation 112 positioned adjacent to a collimator 114. The X-ray source 112 may be an X-ray tube, a distributed X-ray source (such as a solid-state or thermionic X-ray source) or any other source of X-ray radiation suitable for the acquisition of medical or other images. Conversely, in a PET or SPECT embodiments, a toroidal radiation detector may be provided, a radio-active tracer may be used as a radiation source and the X-ray source may be absent. In the case of MRI, the measurements are samples in Fourier space and can either be applied directly as the input to the neural network or can first be converted to line integrals in sinogram space.

In the depicted example, the collimator 114 shapes or limits a beam of X-rays 116 that passes into a region in which a patient/object 118, is positioned. In the depicted example, the X-rays 116 are collimated to be a cone-shaped beam, i.e., a cone-beam, that passes through the imaged volume. A portion of the X-ray radiation 120 passes through or around the patient/object 118 (or other subject of interest) and impacts a detector array, represented generally at reference numeral 122. Detector elements of the array produce electrical signals that represent the intensity of the incident X-rays 120. These signals are acquired and processed to reconstruct images of the features within the patient/object 118.

Source 112 is controlled by a system controller 124, which furnishes both power, and control signals for CT examination sequences, including acquisition of two-dimensional localizer or scout images used to identify anatomy of interest within the patient/object for subsequent scan protocols. In the depicted embodiment, the system controller 124 controls the source 112 via an X-ray controller 126 which may be a component of the system controller 124. In such an embodiment, the X-ray controller 126 may be configured to provide power and timing signals to the X-ray source 112.

Moreover, the detector 122 is coupled to the system controller 124, which controls acquisition of the signals generated in the detector 122. In the depicted embodiment, the system controller 124 acquires the signals generated by the detector using a data acquisition system 128. The data acquisition system 128 receives data collected by readout electronics of the detector 122. The data acquisition system 128 may receive sampled analog signals from the detector 122 and convert the data to digital signals for subsequent processing by a processor 130 discussed below. Alternatively, in other embodiments the digital-to-analog conversion may be performed by circuitry provided on the detector 122 itself. The system controller 124 may also execute various signal processing and filtration functions with regard to the acquired image signals, such as for initial adjustment of dynamic ranges, interleaving of digital image data, and so forth.

In the embodiment illustrated in FIG. 2, system controller 124 is coupled to a rotational subsystem 132 and a linear positioning subsystem 134. The rotational subsystem 132 enables the X-ray source 112, collimator 114 and the detector 122 to be rotated one or multiple turns around the patient/object 118, such as rotated primarily in an x,y-plane about the patient. It should be noted that the rotational subsystem 132 might include a gantry or C-arm upon which the respective X-ray emission and detection components are disposed. Thus, in such an embodiment, the system controller 124 may be utilized to operate the gantry or C-arm.

The linear positioning subsystem 134 may enable the patient/object 118, or more specifically a table supporting the patient, to be displaced within the bore of the CT system 110, such as in the z-direction relative to rotation of the gantry. Thus, the table may be linearly moved (in a continuous or step-wise fashion) within the gantry to generate images of particular areas of the patient 118. In the depicted embodiment, the system controller 124 controls the movement of the rotational subsystem 132 and/or the linear positioning subsystem 134 via a motor controller 136.

In general, system controller 124 commands operation of the imaging system 110 (such as via the operation of the source 112, detector 122, and positioning systems described above) to execute examination protocols and to process acquired data. For example, the system controller 124, via the systems and controllers noted above, may rotate a gantry supporting the source 112 and detector 122 about a subject of interest so that X-ray attenuation data may be obtained at one or more views relative to the subject. In the present context, system controller 124 may also include signal processing circuitry, associated memory circuitry for storing programs and routines executed by the computer (such as routines for performing hierarchical tomographic reconstruction techniques described herein), as well as configuration parameters, image data, and so forth.

In the depicted embodiment, the image signals acquired and processed by the system controller 124 are provided to a processing component 130 for reconstruction of images in accordance with the presently disclosed algorithms. The processing component 130 may be one or more general or application-specific microprocessors. The data collected by the data acquisition system 128 may be transmitted to the processing component 130 directly or after storage in a memory 138. Any type of memory suitable for storing data might be utilized by such an exemplary system 110. For example, the memory 138 may include one or more optical, magnetic, and/or solid state memory storage structures. Moreover, the memory 138 may be located at the acquisition system site and/or may include remote storage devices for storing data, processing parameters, and/or routines for hierarchical image reconstruction, as described below.

The processing component 130 may be configured to receive commands and scanning parameters from an operator via an operator workstation 140, typically equipped with a keyboard and/or other input devices. An operator may control the system 110 via the operator workstation 140. Thus, the operator may observe the reconstructed images and/or otherwise operate the system 110 using the operator workstation 140. For example, a display 142 coupled to the operator workstation 140 may be utilized to observe the reconstructed images and to control imaging. Additionally, the images may also be printed by a printer 144 which may be coupled to the operator workstation 140.

Further, the processing component 130 and operator workstation 140 may be coupled to other output devices, which may include standard or special purpose computer monitors and associated processing circuitry. One or more operator workstations 140 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 140 may also be coupled to a picture archiving and communications system (PACS) 146. PACS 146 may in turn be coupled to a remote client 148, radiology department information system (RIS), hospital information system (HIS) or to an internal or external network, so that others at different locations may gain access to the raw or processed image data.

While the preceding discussion has treated the various exemplary components of the imaging system 110 separately, these various components may be provided within a common platform or in interconnected platforms. For example, the processing component 130, memory 138, and operator workstation 140 may be provided collectively as a general or special purpose computer or workstation configured to operate in accordance with the aspects of the present disclosure. In such embodiments, the general or special purpose computer may be provided as a separate component with respect to the data acquisition components of the system 110 or may be provided in a common platform with such components. Likewise, the system controller 124 may be provided as part of such a computer or workstation or as part of a separate system dedicated to image acquisition.

The system of FIG. 2 may be utilized to acquire X-ray projection data (or other scan data for other modalities) for a variety of views about a region of interest of a patient to reconstruct images of the imaged region using the scan data. Projection (or other) data acquired by a system such as the imaging system 110 may be hierarchically reconstructed as discussed herein to perform a tomographic reconstruction. In particular, the present approach utilizes analytical, iterative, and/or deep learning techniques for hierarchical reconstruction of images from large scale datasets. In the described hierarchical reconstruction approach, reconstruction is decomposed into multiple stages. In the first stage partial (weighted) line integrals are estimated from full line integrals. In the final stage voxels are estimated from the intermediate line integrals. Additional stages may be provided to go from longer intermediate line integrals to shorter intermediate line integrals. One benefit of this approach is that at each stage the elementary reconstruction tasks are localized in terms of number of angular ranges, number of radial distances and number of partial intervals or positions of the intermediate line integrals considered.

Figure 3:
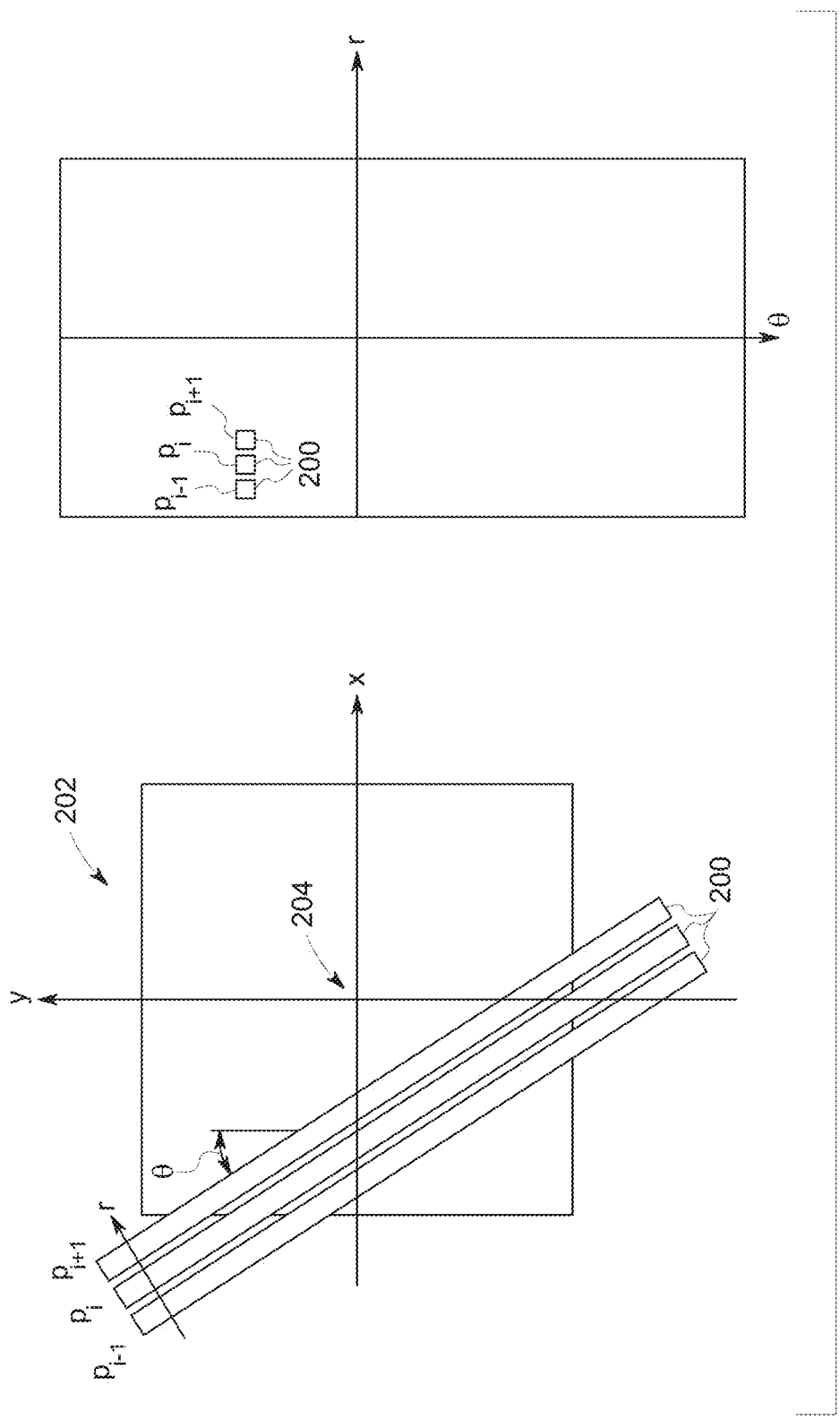
FIG. 3 depicts projection space and image space representations of line integrals, in accordance with aspects of the present disclosure.

With the preceding in mind, some basic background and context is needed so as to facilitate explanation of the relevant concepts to the present hierarchical approach. As used herein, the term "line integrals" refers to the original measurements, or integrals, over the entire length of the image, as shown conceptually in FIG. 3 where in the leftmost depiction three line integrals 200 corresponding to projections $p_i$, $p_{i-1}$, and $p_{i+1}$ are depicted spanning an image 202 having x- and y-dimensions in image space. Each line integral 200 represents the measurement of X-rays observed for the linear path through the image shown for the corresponding depicted path, that is, a respective measured value or number corresponding to measured X-rays over the respective line. The line integrals 200 are parameterized by: radial distance r corresponding to the distance of the line integral 200 from the isocenter 204 of the image 202; an in-plane rotation angle θ which is the angle of the line integral 200 relative to the vertical y-axis; and, in the three-dimensional (3D) case a z-distance (i.e., cone angle) corresponding to the out-of-plane angle relative to the depiction in FIG. 3. The corresponding line integral information is shown in projection space in the rightmost depiction, where the values of the line integrals 200 are instead plotted relative to r (radial distance from isocenter 204) and in-plane rotation angle θ. Thus, the line integrals 200 represent the original measurements or scan data acquired by an imaging system. Alternatively, the input data to the first stage may be Fourier samples parametrized by radial frequency k and rotation angle θ.

Figure 4:
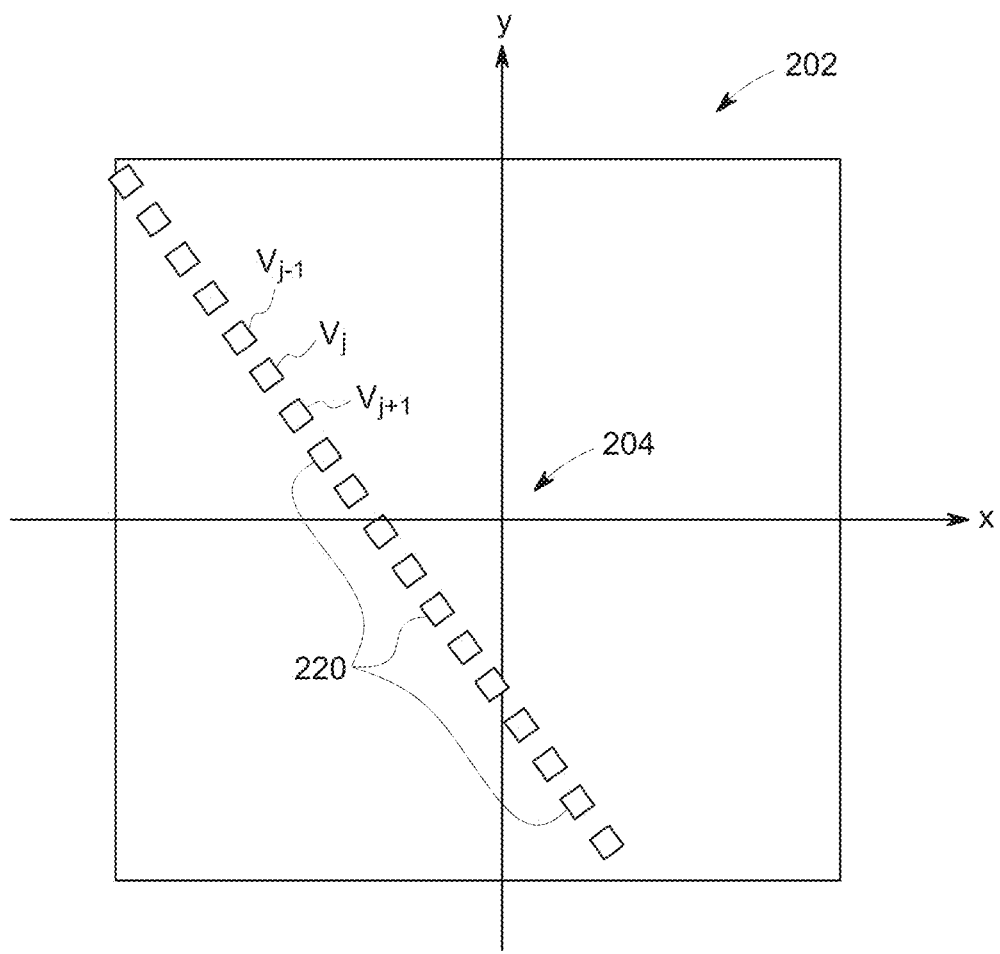
FIG. 4 depicts image space and image space representation of voxels, in accordance with aspects of the present disclosure.

Conversely, and turning to FIG. 4, the reconstructed image may be characterized in the voxel domain, where each voxel (v) 220, represents or corresponds to single voxel values representing an intensity or display value assigned to that display element (i.e., a volumetric image element). A voxel value may be interpreted as a marginal case of a line integral, where the integral is only over the length of the voxel 220, and thus represents measured X-rays only over the length of the voxel. The voxels may be parameterized by: an x-coordinate (comparable to radial distance), a y-coordinate (instead of an angle, since all voxels have the same angle), and, in the 3D case, a z-coordinate as well.

Line integrals 200 and voxels 220 represent the standard data representations of an image acquisition and reconstruction, with conventional reconstruction algorithms going from line integral data to voxels either via analytic or via iterative reconstruction approaches. The present approaches, however, allow for intermediate reconstructions in between the line integrals of the projection domain and the voxels of the image domain. This intermediate domain assumes intermediate line integrals as data points between voxels 220 and line integrals 200. These intermediate data points may be characterized by an additional parameter relative to full line integrals, a y-coordinate specifying the specific intermediate line integral along a line. Alternatively, intermediate line integrals can also be interpreted as non-isotropic voxels, i.e. voxels that are much longer in one direction than in the other direction.

Figure 5:
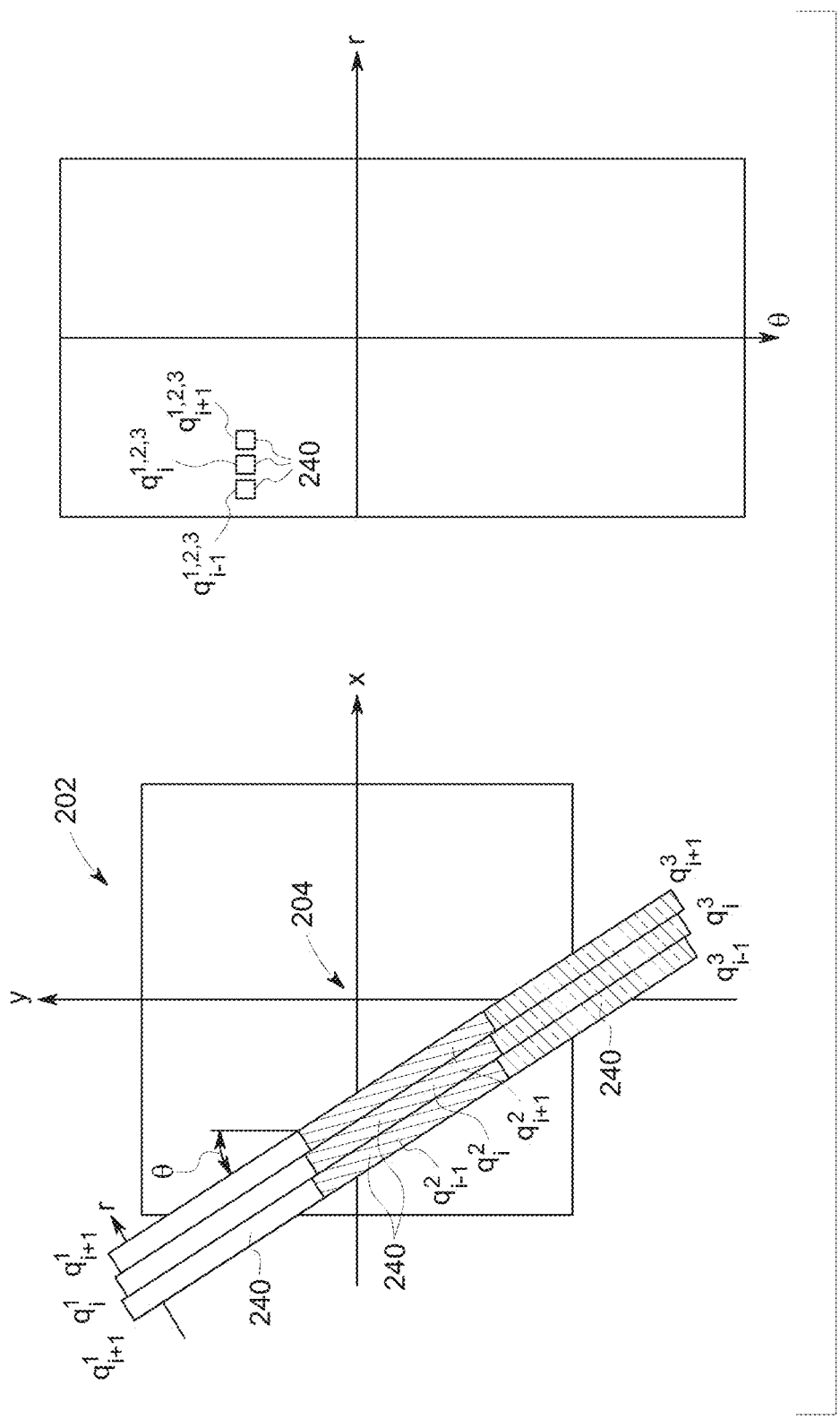
FIG. 5 depicts projection space and image space representations of intermediate line integrals, in accordance with aspects of the present disclosure.

Thus, as used herein, the term "intermediate line integrals" (or "partial" or "weighted" line integrals) refers to a set of virtual or estimated measurements over a portion or a segment of a line through the image, as shown conceptually in FIG. 5 where in the leftmost depiction nine intermediate line integrals (q) 240 are shown corresponding to respective intermediate line integrals 1, 2, and 3 (i.e., $q^1$, $q^2$, and $q^3$) each along projection lines i, i−1, and i+1 to yield intermediate line integrals $q_{i-1}^1$, $q_i^1$, $q_{i+1}^1$, $q_{i-1}^2$, $q_i^2$, $q_{i+1}^2$, $q_{i-1}^3$, $q_i^3$, $q_{i+1}^3$. Thus, all of the intermediate line integrals 240 taken along a given projection line would correspond to the full line integral along that line. Each intermediate line integral 240 represents the virtual measurement of X-ray attenuation for that delimited portion of the linear path through the image, that is, a virtually respectively measured value or number corresponding to X-ray attenuation over the respective partial or limited line.

Thus, turning to FIG. 5 (which depicts intermediate line integrals 240 in the image domain (left) and projection domain (right), as used herein intermediate line integrals are parameterized by: a radial distance r corresponding to the distance of the intermediate line integral 240 from the isocenter 204 of the image 202; an in-plane rotation angle θ which is the angle of the intermediate line integral 240 relative to the vertical y-axis (but typically fewer rotation angles than in the sinogram domain); a y-coordinate specifying the specific intermediate line integral 240 along a line, and, in the 3D case, a z-distance (i.e., cone angle) corresponding to the out-of-plane angle relative to the depiction in FIG. 5. The corresponding intermediate line integral information is shown in projection space in the rightmost depiction, where the values of the intermediate line integrals 240 are plotted relative to r (radial distance from isocenter 204) and in-plane rotation angle θ.

Figure 6:
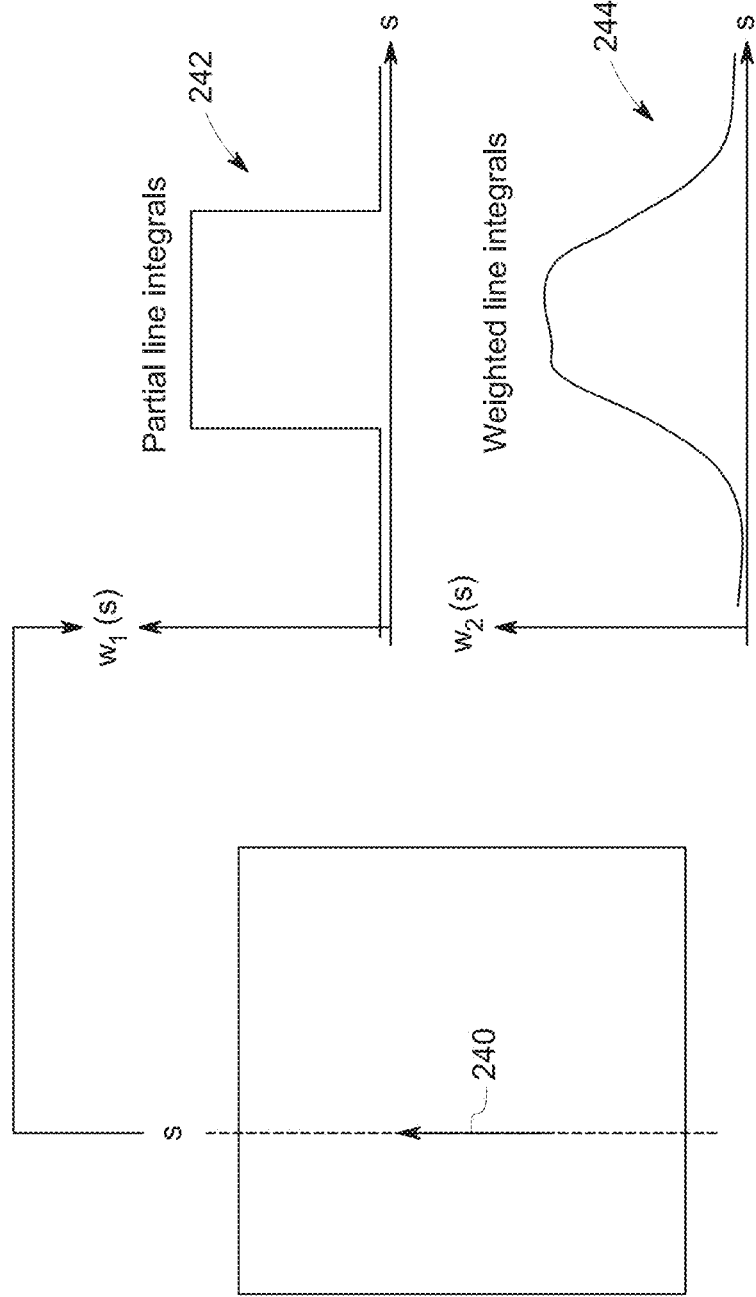
FIG. 6 depicts an example of intermediate line integrals as either partial line integrals or weighted line integrals, in accordance with aspects of the present disclosure.

It may be noted that, as used herein, the term intermediate line integrals 240 may encompass both partial line integrals 242 and weighted line integrals 244, with reference to FIG. 6. That is, an intermediate line integral 240 may have essentially zero weight (i.e., no value) outside the bounds defined for the intermediate line integral and may have essentially a uniform value (e.g., 1) within those bounds, which may be characterized as a partial line integral 242 as used herein. Alternatively, an intermediate line integral 240 may be generated by applying a graded weighting scheme to the values of a corresponding line integral, such that within the bounds defined for the intermediate line integral there is substantially more weight (e.g., at or near a weight of 1) than outside the bounds, where the weight may approach zero, and where the weighting scheme is graded near the bounds so as to have a discernible ramp up and down in weighting values as appropriate. In practice X-ray beams have finite width or certain profiles in cross-section, and therefore the weighting scheme may be applied to the cross-section of the line as well. Such a representation may instead be known as a weighted line integral 244. Thus, as used herein, an intermediate line integral 240 may be a partial line integral 242 or a weighted line integral 244.

Figure 7:
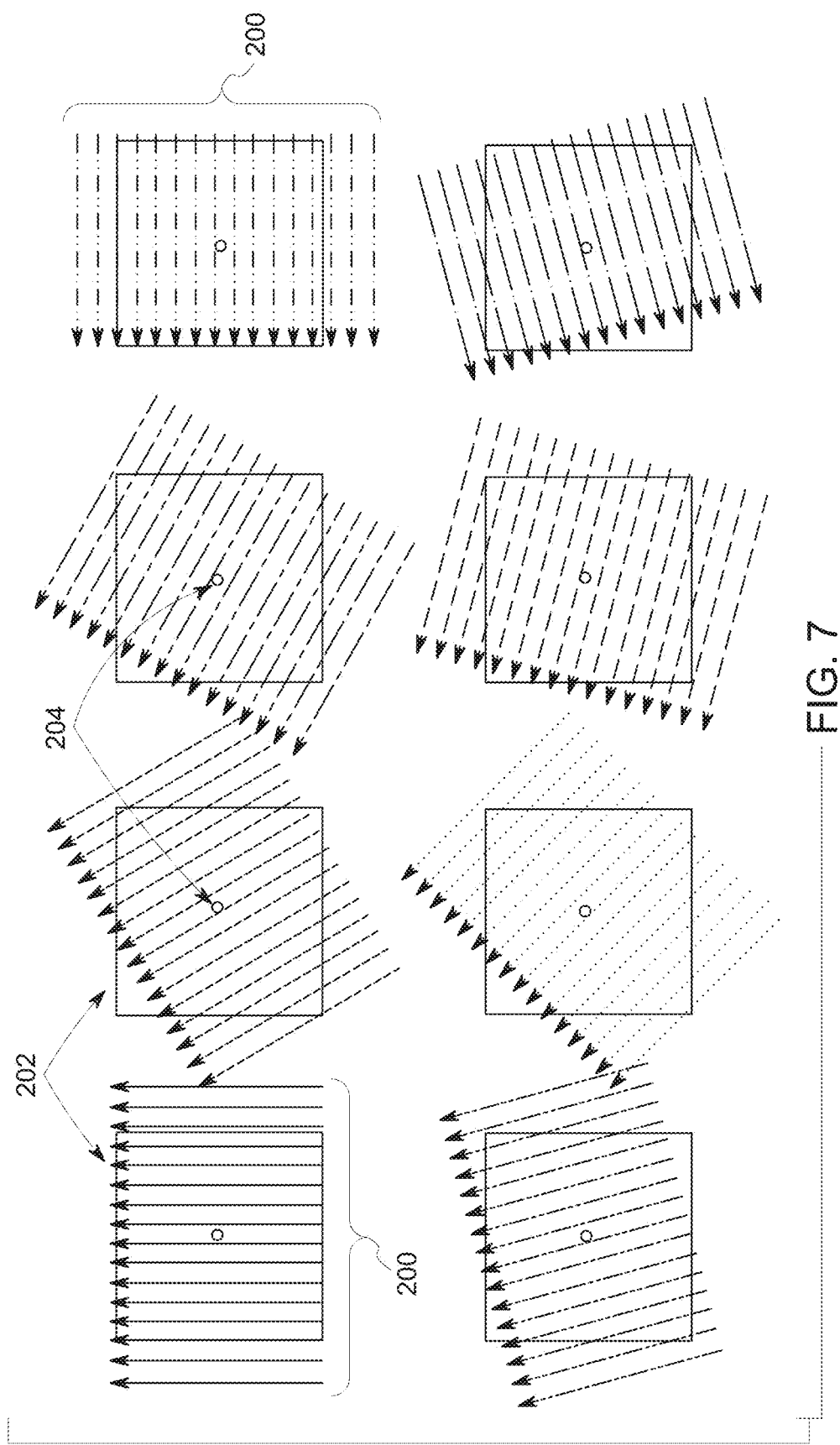
FIG. 7 depicts an image space characterized by line integrals, in accordance with aspects of the present disclosure.

With the preceding in mind, it may be appreciated that a given overall dataset is described differently in these domains. For example, turning to FIG. 7, in the case of the full line integrals, the full line integrals 200 extend across the entire object or image 200 and have many angles (θ) and radial distances (r) but not intermediate line positions or y-coordinates. That is, the full line integrals 200 may be characterized as having many angles, but no partial positions.

Figure 8:
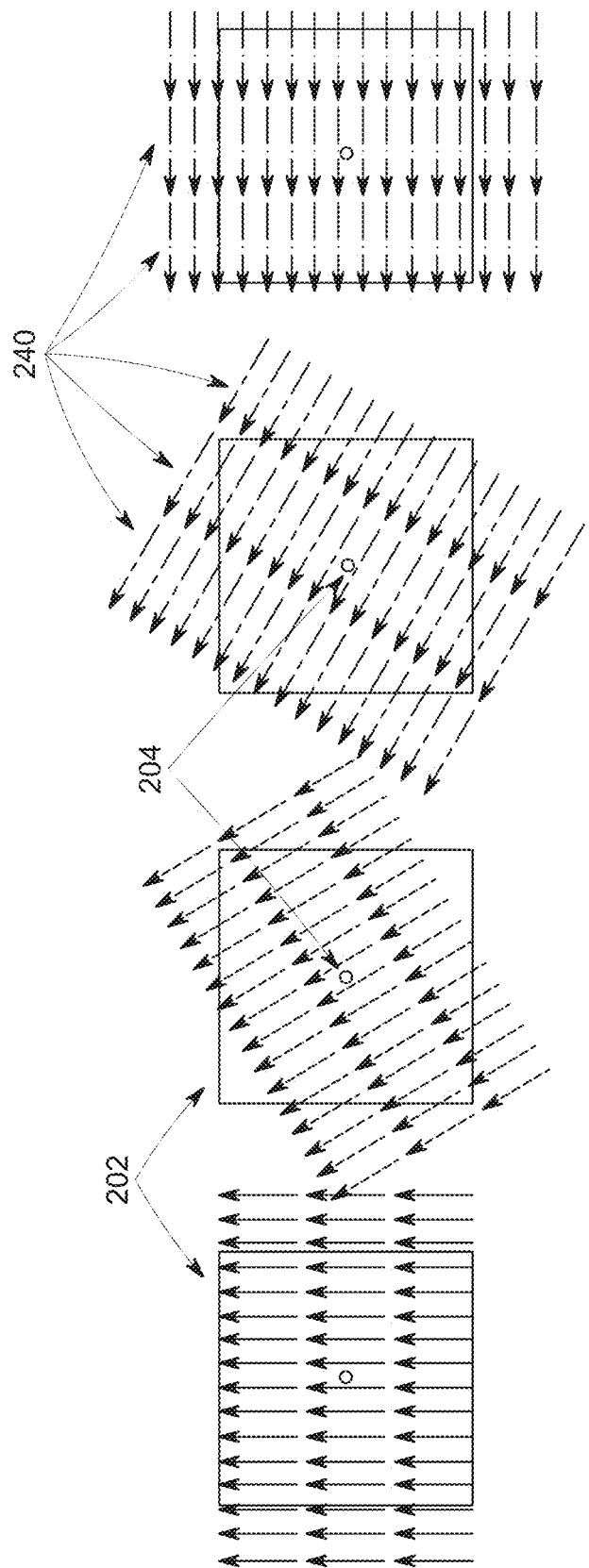
FIG. 8 depicts an image space characterized by intermediate line integrals, in accordance with aspects of the present disclosure.

Conversely, turning to FIG. 8, the intermediate line integrals 240 extend by definition over a portion (i.e., a partial or weighted line) of the object or image 202 and hence require an extra parameter to indicate what portion of the larger line they are integrating over or what their vertical position (i.e., y-coordinate) is. They may be computed at fewer angles than the full line integrals 200 and at fewer vertical positions than there are voxels 220. That is, the intermediate line integrals 240 may be characterized as having fewer angles (relative to the full line integrals 200), but multiple partial positions.

Figure 9:
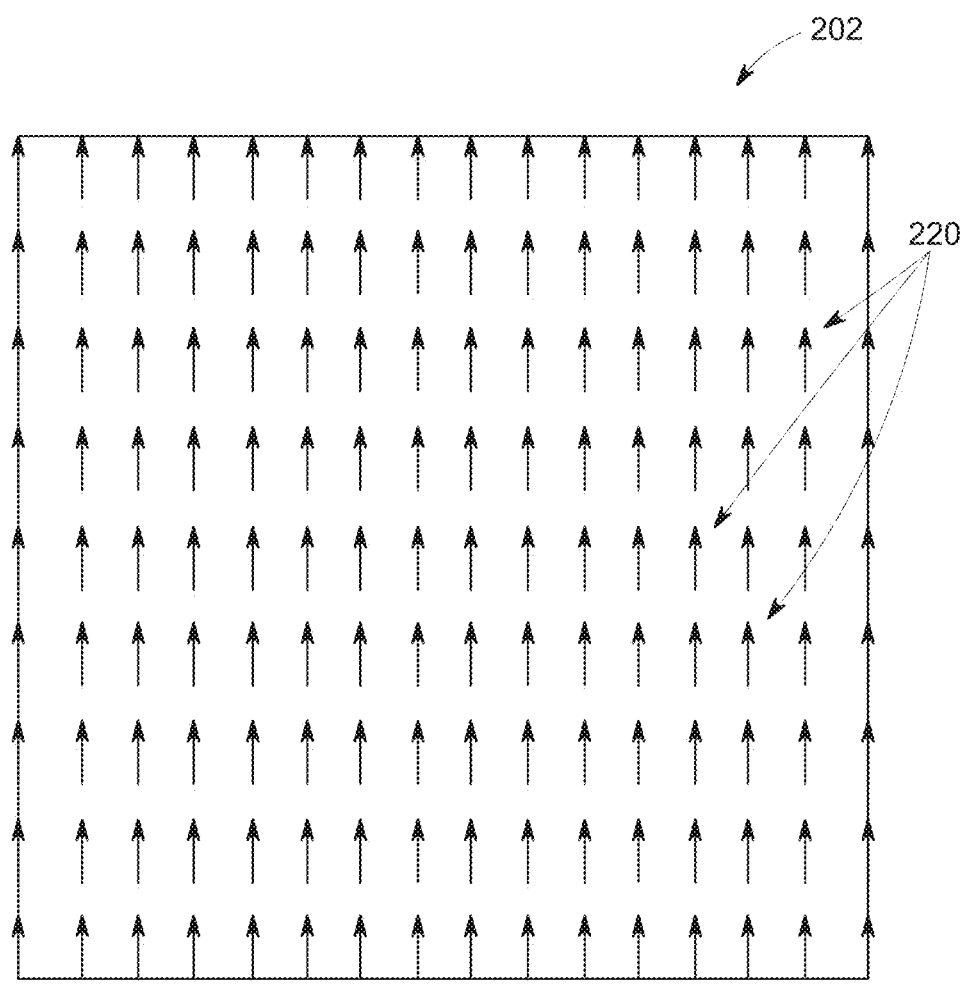
FIG. 9 depicts an image space characterized by intermediate line integrals with the integration length equal to the size of voxels, in accordance with aspects of the present disclosure.

Finally, turning to FIG. 9, voxel values are essentially (normalized) line integrals over the size of the voxel 220. They have no angle (or one single angle) and occur at many horizontal and vertical positions (x- and y-coordinates). That is, the voxels 220 may be characterized as having no angles (or a single angle) and many partial (e.g., vertical) positions.

Figure 10:
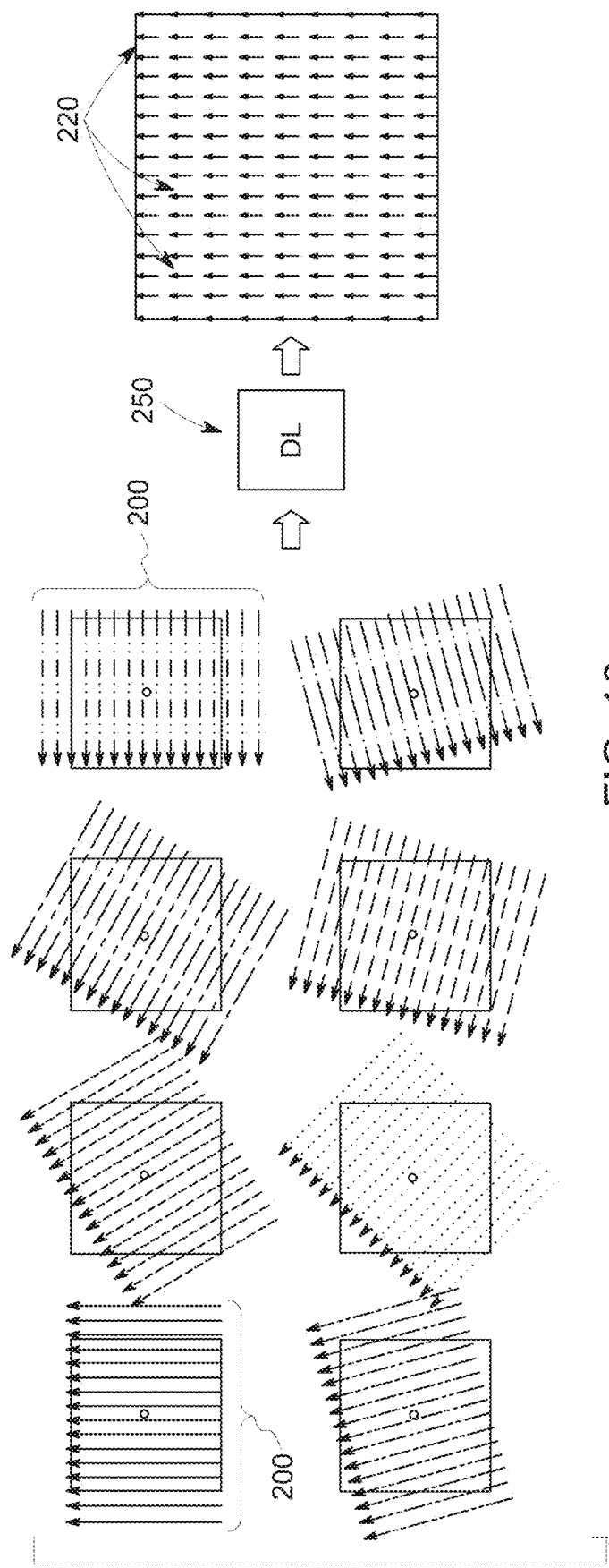
FIG. 10 depicts a reconstruction of an output image from line integrals with no intermediate line integral aspect.

With these concepts in mind, a simplistic brute-force approach to reconstruction using deep learning techniques is illustrated conceptually in FIG. 10. In this example, the deep learning model 250 (e.g., a trained neural network) receives as an input the full line integrals 200 from a scan acquisition and generates as an output the voxel values 220 of the reconstructed image.

In such a brute-force approach, for any given voxel 220, many line integrals 200 are required as input, at least all line integrals 200 that pass through a given voxel 200. Optimal reconstruction may, therefore, require the entire dataset (i.e., line integrals 200 acquired at every view angle) as input to reconstruct a given voxel 220 (if each dataset has a line integral that passes through the respective voxel 220, such as may occur at or near the isocenter). This requirement could lead to a large, many-layer deep learning network 250. This may be impractical in terms of the number of required training datasets and computational complexity.

In contrast, the presently described hierarchical reconstruction approach decomposes the reconstruction into multiple stages. In one implementation, in a first stage partial (e.g., weighted) line integrals 240 are estimated from full line integrals 200. In a subsequent stage voxels 220 are estimated from intermediate line integrals 240. In addition, in certain embodiments, additional stages may be employed, such as to estimate intermediate line integrals of having different parameters (e.g., length) from other intermediate line integrals. That is, in some embodiments it is conceivable to use additional stages so as to go from longer intermediate line integrals to shorter intermediate line integrals in the intermediary stages. One benefit of the presently described hierarchical reconstruction approach is that at each stage the elementary reconstruction tasks are localized in terms of number of angular ranges, number of radial distances, and number of vertical positions considered.

Figure 11:
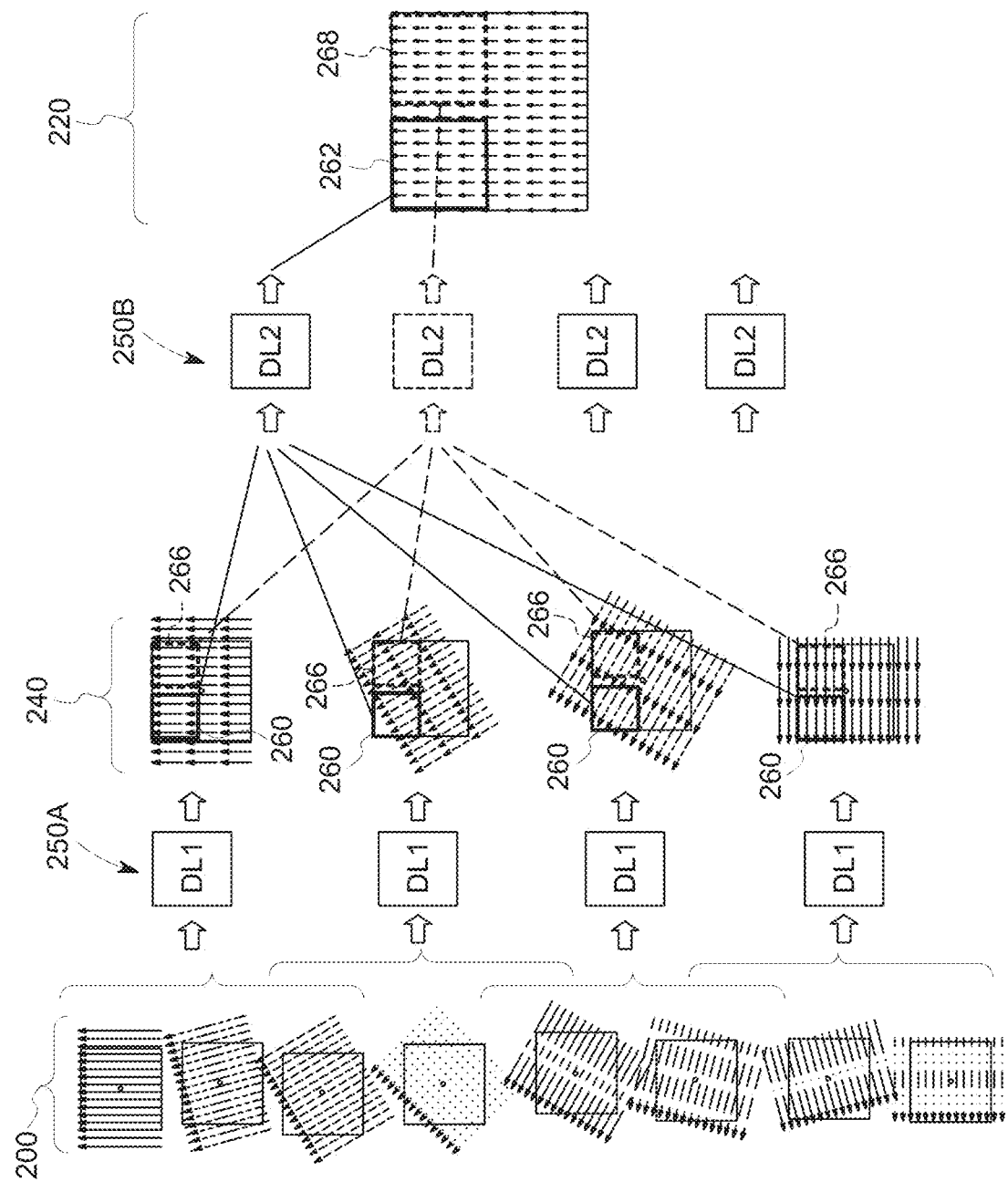
FIG. 11 depicts a reconstruction of an output image from line integrals using intermediate line integral steps, in accordance with aspects of the present disclosure.

For example, turning to FIG. 11, the estimation of the intermediate line integrals 240 using a first deep learning model (or models) 250A (e.g., trained neural network(s)) uses as inputs only the line integrals 220 that are at nearby angular positions and at nearby radial positions. That is, each set of intermediate line integrals 240 is generated using only a subset of the total sets of line integrals 200. Hence the problem becomes a few-to-one or a few-to few estimation problem. Similarly, the estimation of the voxel values 220 using a second deep learning model (or models) 250B uses as inputs only the intermediate line integrals 240 that are at nearby horizontal and vertical positions and which are fewer in angles. Thus, as shown in FIG. 11, only a subset of the intermediate line integrals (denoted by boxes 260) are inputs to the deep learning model 250B used to estimate a subset 262 of the voxels 220, while a different subset of the intermediate line integrals (denoted by boxes 266) are inputs to the deep learning model 250B used to estimate a subset 268 of the voxels 220. Rotational symmetry may be utilized to reduce the number of parameters in deep learning model (or models) 250A (e.g., the same deep learning model may be replicated to process input data in different angular ranges, or the parameters in each deep learning model may have rotational symmetry with respect to line integrals in different angular orientations). In addition, translational invariance may be used to further reduce the number the number of independent parameters in the deep learning model (or models).

In the above examples, a deep-learning approach was indicated as being used to solve each elementary reconstruction (i.e., hierarchical deep-learning). However, it should also be understood that other approaches, such as iterative reconstruction comprising one or more of an ordered subset expectation maximization (OSEM), penalized likelihood reconstruction, compressed-sensing reconstruction, algebraic reconstruction technique (ART), projection onto convex sets (POCS) reconstruction, or filtered versions of these iterative reconstructions can also be used to solve the sub-problems (i.e., hierarchical iterative reconstruction) or even a direct inversion or analytical reconstruction method comprising one or more of limited-angle filtered backprojection (FBP), tomosynthesis reconstruction, or filtered versions of these analytical reconstructions, may be employed (i.e., hierarchical analytical reconstruction).

In addition, Fourier-based methods can also be used to solve the reconstruction from one stage to the next. For instance, in the final reconstruction stage, the intermediate line integrals 240 can be interpreted as an image with good spatial resolution in one wedge in frequency space but poor spatial resolution in other wedges. The intermediate line integrals 240 for all angles can be combined by frequency-domain wedge-weighted combination. In other words, for each angle an upsample step is performed to a full image, the Fourier transform is taken, and only the frequencies that have high-resolution are maintained. The results are then accumulated and the inverse Fourier transform taken. The intermediate line integrals 240 may be combined more optimally by taking into account the noise statistics in the corresponding angular range.

With respect to the presently described approach, an initial study was performed to test a two-step hierarchical reconstruction for a 4×4 image having values of:

$$\begin{bmatrix} 0 & 0 & 0 & 0 \\ 0 & 2 & 0 & 0 \\ 0 & 0 & 2 & 0 \\ 0 & 1 & 0 & 0 \end{bmatrix}$$

A total of 58 line integrals were computed as the sum of 4 voxels (i.e., the distance across the 4×4 image) and random noise was added. Similarly, a total of 36 intermediate line integrals (intermediate level) were defined as the sum of two voxels (i.e., a partial distance across the 4×4 image).

Figure 12:
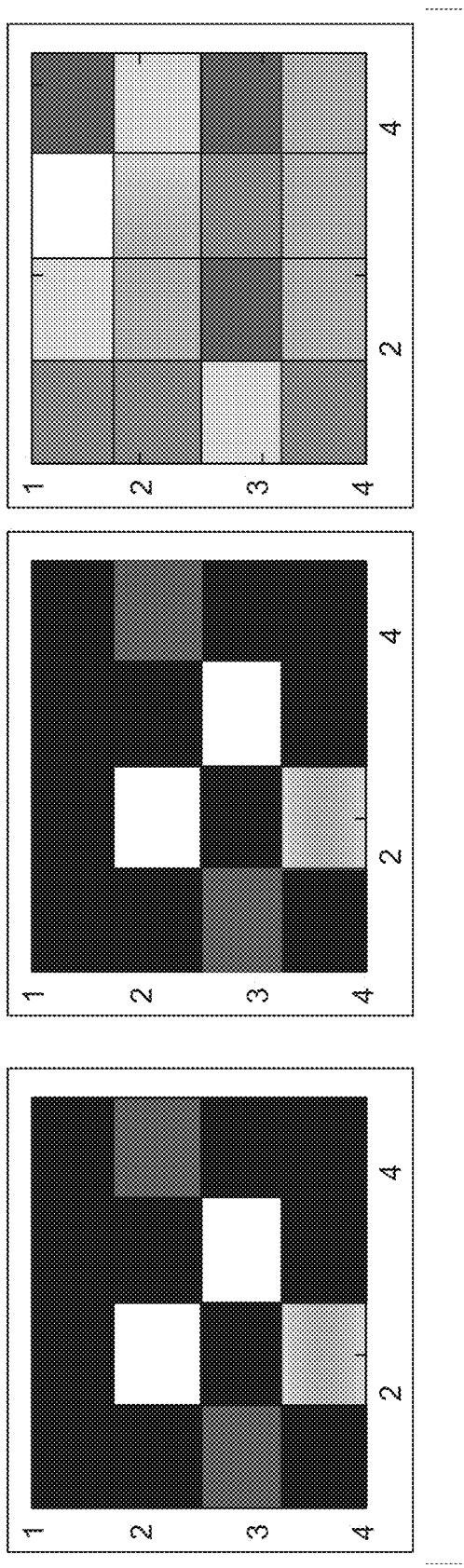
FIG. 12 depicts study results of a sample image generated without intermediate line integral steps, a sample image generated with intermediate line integral steps, and a difference image, in accordance with aspects of the present disclosure.

In a first reconstruction, a one-step least squares inversion was performed from line integrals to voxels, yielding the left-most image of FIG. 12. A two-step least squares inversion was also performed, from line integrals to intermediate line integrals and from intermediate line integrals to voxels (yielding the center image of FIG. 12). A difference image was calculated and is shown as the right-image of FIG. 12 using the same grayscale window width as the original images. As shown in this series of images, the two-step approach did not dramatically change the quality of the result compared to the one-step reconstruction.

Figure 13:
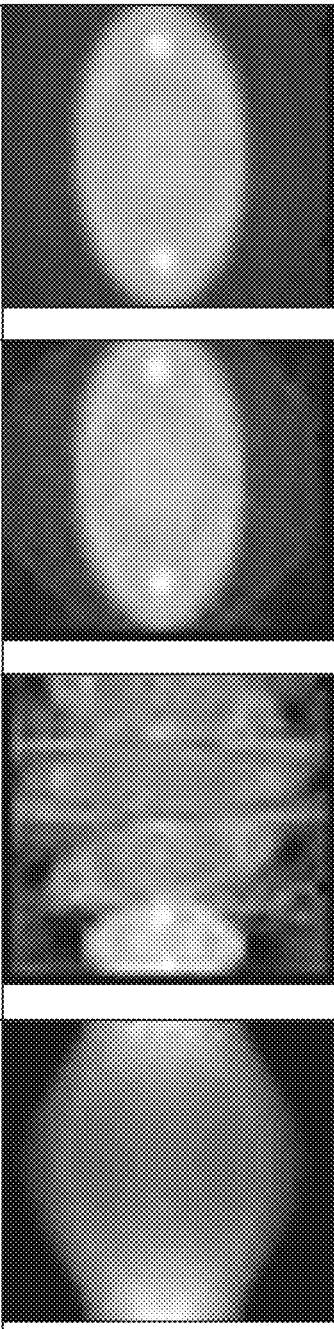
FIG. 13 depicts study results of a ground truth image and process and a sample image generated using a hierarchical reconstruction, in accordance with aspects of the present disclosure.

In another study, a more detailed implementation was performed with a total of three stages (one input stage, one intermediate stage, and one output stage, L=2). The input stage contained 32 projection views, 1 partial integral along each line, and 32 detector cells ($N_a^{(0)}=32$, $N_b^{(0)}=1$, $N_c^{(0)}=32$). The intermediate stage contained 4 projection angles, 8 partial integrals along each line, and 32 detector cells ($N_a^{(1)}=4$, $N_b^{(1)}=8$, $N_c^{(1)}=32$). The output stage contained 1 projection angle, 32 partial integrals along each line, and 32 detector cells ($N_a^{(2)}=1$, $N_b^{(2)}=32$, $N_c^{(2)}=32$). The kernel size (i.e., the sparsity) at stage 1 was $w_a^{(1)}=9$, $w_b^{(1)}=1$, $w_c^{(1)}=7$. The kernel size at stage 2 was $w_a^{(1)}=9$, $w_b^{(1)}=3$, $w_c^{(1)}=3$. The neural network 50 was trained with 1600 pairs of computer simulated random noise patterns and the corresponding intermediate line integrals 240. The training was performed with a gradient descent algorithm (100 iterations, 16 subsets) with a least-squares cost function to optimize the network interconnection weights. The training was first performed for each individual stage to initialize the neural network, then all stages were connected and trained altogether. FIG. 13 depicts the result produced by the trained hierarchical neural network 50 from a simulation dataset of a phantom object that was not used during the training. The Stage 0 cell depicts the actual sinogram data. The Stage 1 cell depicts the intermediate image (i.e., the intermediate line integral stage) as generated as the result of a hierarchical reconstruction as discussed herein. The State 2 cell depicts the output image generated by the hierarchical reconstruction described herein. The ground truth reconstruction by a standard FBP algorithm is provided as reference.

While the preceding describes basic concepts of a hierarchical reconstruction process using deep learning models, as discussed herein, various other aspects of tomographic reconstruction are impacted by the use of an intermediate imaging domain.

By way of example, in the field of tomographic image reconstruction, the general system forward model is generally written as y=Ax, where x is an image of the object; y is the measurement data; and A is a system matrix. Although the forward model A is relatively sparse (Radon or X-ray transform), the inverse problem is not, i.e., $x=A^{-1}y$ is dense (i.e., reconstruction of a single pixel requires the all the measurements, as noted above). A goal of research in this field has been to overcome this challenge. In particular, if an efficient way to compute and store $A^{-1}$ can be described, many inherent difficulties in tomographic reconstruction are addressed.

The proposed hierarchical approach provides an approach to compute and store $A^{-1}$ in an efficient manner. In particular, the hierarchical structure (i.e., use of intermediate domains having data representation as intermediate line integrals) can be utilized to factorize the dense matrix $A^{-1}$ into the product of a series of sparse matrices, i.e., $A^{-1}=H_1 H_2 \ldots H_N$, where $H_i$ is sparse (i.e., an output value is only determined by input values in its proximal neighborhood). By this factorization, $A^{-1}$ can be stored in the form of a series sparse matrices $H_i$. Computing $A^{-1}y$ can be realized by a series of matrix-vector product which is very computationally-efficient on computers.

In a further example, the Hessian matrix is based on a statistically-based cost function and is commonly used in the design and analysis of iterative reconstruction algorithms. For example, the inverse of the Hessian matrix can be used as a preconditioner to accelerate iterative reconstruction. The Hessian matrix can also be used in calculating the detectability index in the evaluation of task-based performance of reconstruction algorithms. Conventionally, the inverse of the Hessian matrix is not practical to compute; only local approximations can be used in practice, at the cost of losing accuracy and constraining of the analysis to a few pre-determined image locations instead of the entire image. By applying the hierarchical structure as discussed herein, the inverse of Hessian can be factorized as $(A^T W A)^{-1} \approx A^{-1} W^{-1} A^{-T} \approx H_1 H_2 \ldots H_N W^{-1} H_N^T \ldots H_2^T H_1^T$, which can be efficiently stored and computed.

A further advantage of the hierarchical reconstruction process as discussed herein is that intermediate images may be generated at reduced time and computational cost, but which may be sufficient for certain tasks. For example, while the hierarchical reconstruction structure described herein can provide a conventional image as the final output, such as for diagnosis or clinical use, intermediate results (i.e., images or portions of images) from the hidden layers 58 (FIG. 1) can be interpreted as limited-angle partial reconstructions.

These partial reconstructions better preserve the statistical properties of the original projection data, and thus can be used for computer aided detection tasks to achieve higher detection accuracy. Ideally, the original sinogram data could be used by a computer-aided detection algorithm to achieve the best detection performance but such an algorithm would be difficult to design and implement because any local features in the image domain spread into a large area in the sinogram (i.e., projection) domain. The partial reconstruction(s) generated by the hidden layers 58 in the hierarchical structure reconstruction, however, preserve local image features and thus can be an alternative form of data to derive high-performance detection algorithms.

Figure 14:
FIG. 14 depicts an example of a hierarchical network structure, in accordance with aspects of the present disclosure.

With respect to the structure and training of a neural network to perform a hierarchical reconstruction as discussed herein, an example of a hierarchical network structure is shown in FIG. 14. As the input data (e.g., input sinogram 280) is processed through the neural network, the angular dimension is progressively merged and reduced, and the line segment dimension is progressively expanded and refined. At the output of the neural network, a regular reconstructed image (i.e., output image 282) will be generated. In the depicted example, the extracted regions 284 illustrate that each individual value in successive partial reconstructions (i.e., successive layers) is determined by a small localized range of data in the corresponding previous layer.

Table 1, below, defines various hyper-parameters for the network structure.

TABLE 1

| | |
|---|---|
| $N_a^{(0)}, N_b^{(0)}, N_c^{(0)}$ | Integers denoting the size of the input sinogram in the angular, line segments, and radial dimensions, respectively, at the input of the network. For a regular CT sinogram, $N_b^{(0)} = 1$ |
| L | An integer denoting the number of hierarchical stages. typically, $L \approx \log_2 N_a^{(0)}$ |
| $N_a^{(l)}, N_b^{(l)}, N_c^{(l)}$ | Integers denoting the size of data in angular, line segment, and radial dimensions, respectively, at stage l, $1 \leq l \leq L$ |
| $k_a^{(l)}, k_b^{(l)}$ | Rational numbers denoting the angle-subsampling ratio and line-segment-oversampling ratio at layer l $k_a^{(l)}, k_b^{(l)} \approx 1$ $0 < k_a^{(l)} < 1 < k_b^{(l)}$ typically, $k_a \approx \frac{1}{2}, k_b \approx 2$ $N_a^{(l+1)} = k_a^{(l+1)} N_a^{(l)} \approx \frac{N_a^{(0)}}{2^{l+1}}$ $N_b^{(l+1)} = k_b^{(l+1)} N_b^{(l)} \approx 2^{l+1}$ |
| $w_a^{(l)}, w_b^{(l)}, w_c^{(l)}$ | Integers denoting the size of the kernel in the angular, line segment, and radial dimensions, respectively, at layer l |

It should also be noted that in certain implementations, the hierarchical reconstruction process may benefit from a re-binning of the sinogram data prior to processing. In particular, the geometric implications are simplified if, before the convolution steps shown in FIG. 14 (i.e., the processing of each layer of the neural network), a re-binning of the data to correspond to a parallel beam geometry is performed. In this manner, acquired data may be re-binned to represent data acquired using a parallel beam acquisition, which is geometrically more-straightforward to handle.

Technical effects of the invention include use of a hierarchical reconstruction approach that employs data representations in intermediate steps are between a full line integral and a voxel (e.g., an intermediate line integral). Each of the steps is progressively more local in nature and therefore has computational advantages and is amenable to a deep learning solution using trained neural networks. The proposed hierarchical structure provides a mechanism to divide a large-scale inverse problem into a series of smaller-scale problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A hierarchical tomographic reconstruction method, comprising:

acquiring or accessing a set of scan data, wherein the set of scan data is initially represented by a set of original measurements;

processing the set of scan data using a hierarchy of reconstruction steps, wherein at least a portion of the reconstruction steps process the set of original measurements through a progression of one or more intermediate integral representations, wherein at least one of the one or more intermediate integral representation is generated using a subset of the data in the neighboring reconstruction steps;

processing the intermediate integral representations to generate voxel values of a reconstructed image;

wherein the set of original measurements comprises a set of line integrals;

wherein the intermediate integral representations comprise partial line integrals; and wherein each partial line integral refers to a set of estimated integrals over a partial line through the reconstructed image.

2. The hierarchical tomographic reconstruction method of claim 1, wherein one or more reconstruction steps of the hierarchy of reconstruction steps processes the set of original measurements or a respective set of intermediate integral representations using a trained neural network.

3. The hierarchical tomographic reconstruction method of claim 2, wherein the trained neural network comprises a plurality of layers and at least one layer generates one or more intermediate integral representations of the set of original measurements.

4. The hierarchical tomographic reconstruction method of claim 1, wherein one or more reconstruction steps of the hierarchy of reconstruction steps comprises an iterative reconstruction step.

5. The hierarchical tomographic reconstruction method of claim 1, wherein one or more reconstruction steps of the hierarchy of reconstruction steps comprises a direct inversion or analytical reconstruction step.

6. The hierarchical tomographic reconstruction method of claim 1, wherein one or more reconstruction steps of the hierarchy of reconstruction steps comprises a Fourier-based reconstruction step.

7. The hierarchical tomographic reconstruction method of claim 1, wherein the intermediate line integral representations comprise weighted line integrals.

8. An image processing system comprising:

a processor configured to execute one or more stored processor-executable routines; and a memory storing the one or more executable-routines, wherein the one or more executable routines, when executed by the processor, cause acts to be performed comprising:

acquiring or accessing a set of scan data, wherein the set of scan data is initially represented by a set of original measurements;

processing the set of scan data using a hierarchy of reconstruction steps, wherein at least a portion of the reconstruction steps process the set of original measurements through a progression of one or more intermediate integral representations, wherein at least one of the one or more intermediate integral representation is generated using a subset of the data in the neighboring reconstruction steps;

processing the intermediate integral representations to generate voxel values of a reconstructed image;

wherein the set of original measurements comprises a set of line integrals;

wherein the intermediate integral representations comprise partial line integrals; and wherein each partial line integral refers to a set of estimated integrals over a partial line through the reconstructed image.

9. The imaging processing system of claim 8, wherein the set of scan data comprises computed tomography (CT) scan data, C-arm scan data, positron emission tomography (PET) scan data, single photon emission computed tomography (SPECT) scan data, or magnetic resonance imaging (MRI) scan data.

10. The imaging processing system of claim 8, wherein one or more reconstruction steps of the hierarchy of reconstruction steps processes the set of original measurements or a respective set of intermediate integral representations using a trained neural network.

11. The imaging processing system of claim 8, wherein one or more reconstruction steps of the hierarchy of reconstruction steps comprise one or more of: an iterative reconstruction step; a direct inversion or an analytical reconstruction step; or a Fourier-based reconstruction step.

12. The imaging processing system of claim 8, wherein the intermediate line integral representation comprises weighted line integrals.

* * * * *